(12) United States Patent
Chefalas et al.

(10) Patent No.: US 10,372,127 B2
(45) Date of Patent: Aug. 6, 2019

(54) DRONE AND DRONE-BASED SYSTEM AND METHODS FOR HELPING USERS ASSEMBLE AN OBJECT

(71) Applicant: International Business Machines Corporation, Armonk, NY (US)

(72) Inventors: Thomas E. Chefalas, Somers, NY (US); Andrzej Kochut, Mount Kisco, NY (US); Clifford A. Pickover, Yorktown Heights, NY (US); Komminist Weldemariam, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 246 days.

(21) Appl. No.: 15/212,752

(22) Filed: Jul. 18, 2016

(65) Prior Publication Data
US 2018/0016003 A1    Jan. 18, 2018

(51) Int. Cl.
*G05D 1/00* (2006.01)
*B64C 39/02* (2006.01)
*B64D 47/02* (2006.01)
*G06Q 10/10* (2012.01)

(52) U.S. Cl.
CPC ......... *G05D 1/0088* (2013.01); *B64C 39/024* (2013.01); *B64D 47/02* (2013.01); *G06Q 10/1093* (2013.01); *B64C 2201/024* (2013.01); *B64C 2201/027* (2013.01); *B64C 2201/108* (2013.01); *B64C 2201/12* (2013.01); *B64C 2201/123* (2013.01); *B64C 2201/126* (2013.01);
(Continued)

(58) Field of Classification Search
CPC ..... B64C 39/024; B64D 47/02; G05D 1/0088

USPC ............................................................ 701/3
See application file for complete search history.

(56) References Cited

U.S. PATENT DOCUMENTS

| | | | |
|---|---|---|---|
| 6,572,379 | B1 | 6/2003 | Sears |
| 7,533,798 | B2 | 5/2009 | Jones et al. |
| 8,419,433 | B2 | 4/2013 | Do et al. |

(Continued)

FOREIGN PATENT DOCUMENTS

| | | | |
|---|---|---|---|
| EP | 1065603 A2 | | 1/2001 |
| EP | 3072818 | * | 9/2016 |
| EP | 3072818 A1 | | 9/2016 |

OTHER PUBLICATIONS

Soren Goyal and Paul Benjamin, "Object Recognition Using Deep Neural Networks: A Survey", arXiv:1412.3684v1 [cs. CV] Dec. 10, 2014, (7 pages).

(Continued)

*Primary Examiner* — Muhammad Shafi
(74) *Attorney, Agent, or Firm* — Harrington & Smith

(57) ABSTRACT

A drone-based system determines a user cohort for one or more users to assemble an object. The drone-based system assesses a task for the one or more users to assemble the object. Based on the determined user cohort and the assessed task, a drone of the drone-based system provides help to the one or more users as the one or more users assemble the object. The drone-based system may comprise a drone and one or more memories and computer readable code and one or more processors. The one or more processors, in response to execution of the computer readable code, cause the drone-based system to perform operations. The drone-based system may be only the drone or the drone and one or more servers.

23 Claims, 8 Drawing Sheets

(52) U.S. Cl.
CPC .. *B64C 2201/141* (2013.01); *B64C 2201/146* (2013.01)

(56) References Cited

U.S. PATENT DOCUMENTS

| | | | |
|---|---|---|---|
| 9,221,117 | B2 | 12/2015 | Conrardy et al. |
| 9,355,423 | B1 | 5/2016 | Slusar |
| 9,446,515 | B1 | 9/2016 | Meier |
| 9,468,988 | B2 | 10/2016 | Daniel |
| 9,529,359 | B1 | 12/2016 | Annan |
| 9,671,786 | B2 | 6/2017 | Baltes et al. |
| 9,685,099 | B2 | 6/2017 | Boulware et al. |
| 9,724,824 | B1 | 8/2017 | Annan |
| 2004/0195310 | A1 | 10/2004 | Silverbrook et al. |
| 2006/0184369 | A1 | 8/2006 | Levonas |
| 2006/0204041 | A1 | 9/2006 | Hammoud |
| 2006/0204042 | A1 | 9/2006 | Hammoud |
| 2006/0212809 | A1 | 9/2006 | Oshima |
| 2007/0102565 | A1 | 5/2007 | Speer |
| 2007/0220525 | A1 | 9/2007 | State |
| 2007/0273638 | A1 | 11/2007 | Nohno |
| 2008/0004116 | A1 | 1/2008 | Van Luchene et al. |
| 2008/0046222 | A1 | 2/2008 | Van Luchene et al. |
| 2008/0180235 | A1 | 7/2008 | Chang |
| 2008/0303915 | A1* | 12/2008 | Omi .................. G06K 9/00255 348/222.1 |
| 2010/0286824 | A1* | 11/2010 | Solomon ................. F41H 13/00 700/248 |
| 2011/0055150 | A1 | 3/2011 | Bohm |
| 2011/0166824 | A1* | 7/2011 | Haisty ..................... G01B 5/12 702/157 |
| 2012/0001939 | A1 | 1/2012 | Sandberg |
| 2013/0060369 | A1 | 3/2013 | Simard et al. |
| 2013/0088514 | A1 | 4/2013 | Breuss-Schneeweis |
| 2013/0297690 | A1 | 11/2013 | Lucero |
| 2014/0063055 | A1* | 3/2014 | Osterhout ............... G06F 3/005 345/633 |
| 2014/0184643 | A1* | 7/2014 | Friend .................... G09G 3/003 345/633 |
| 2015/0306763 | A1 | 10/2015 | Meier |
| 2015/0346724 | A1 | 12/2015 | Jones et al. |
| 2016/0042648 | A1 | 2/2016 | Kothuri |
| 2017/0039517 | A1* | 2/2017 | Amann .................. H04W 4/70 |
| 2017/0115837 | A1 | 4/2017 | Drouin |
| 2017/0123399 | A1* | 5/2017 | Londo ...................... B25H 3/00 |
| 2017/0169561 | A1* | 6/2017 | Mullins ................. G06T 7/0008 |
| 2017/0183097 | A1 | 6/2017 | Miura |
| 2017/0190119 | A1 | 7/2017 | Dow et al. |
| 2017/0203840 | A1 | 7/2017 | Myslinski |
| 2017/0203857 | A1* | 7/2017 | O'Toole ................. B64F 1/32 |
| 2017/0274256 | A1 | 9/2017 | Brekke et al. |
| 2017/0287287 | A1 | 10/2017 | Froy et al. |

OTHER PUBLICATIONS

"Mantis Drone Claw is a Grabbing Claw for Drones", http://www.theengineer.co.uk/students/latest/engineering-graduate-designs-grabbing-claw-for-drones/1021524.article, Dec. 7, 2015, (6 pages).

* cited by examiner

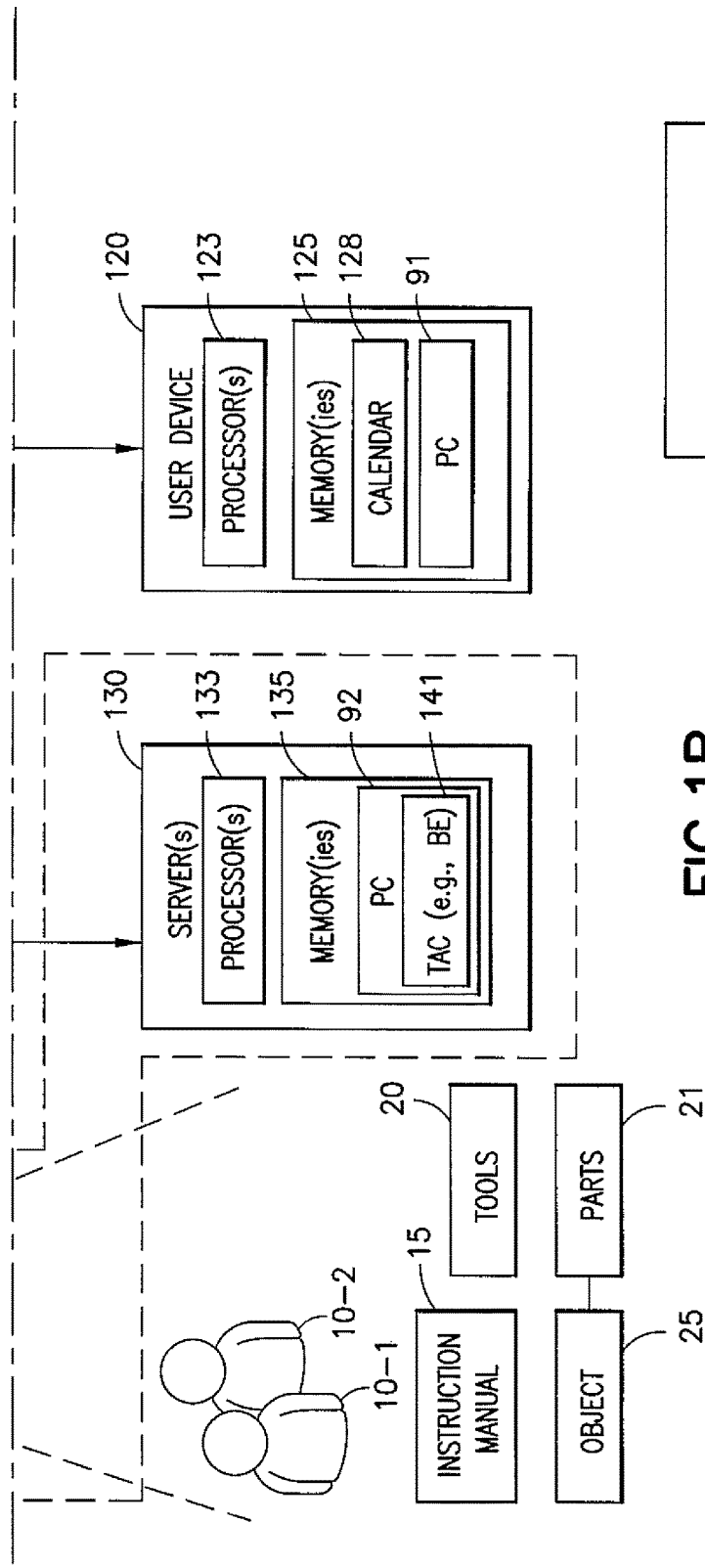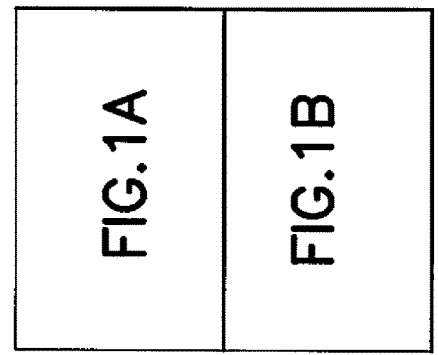

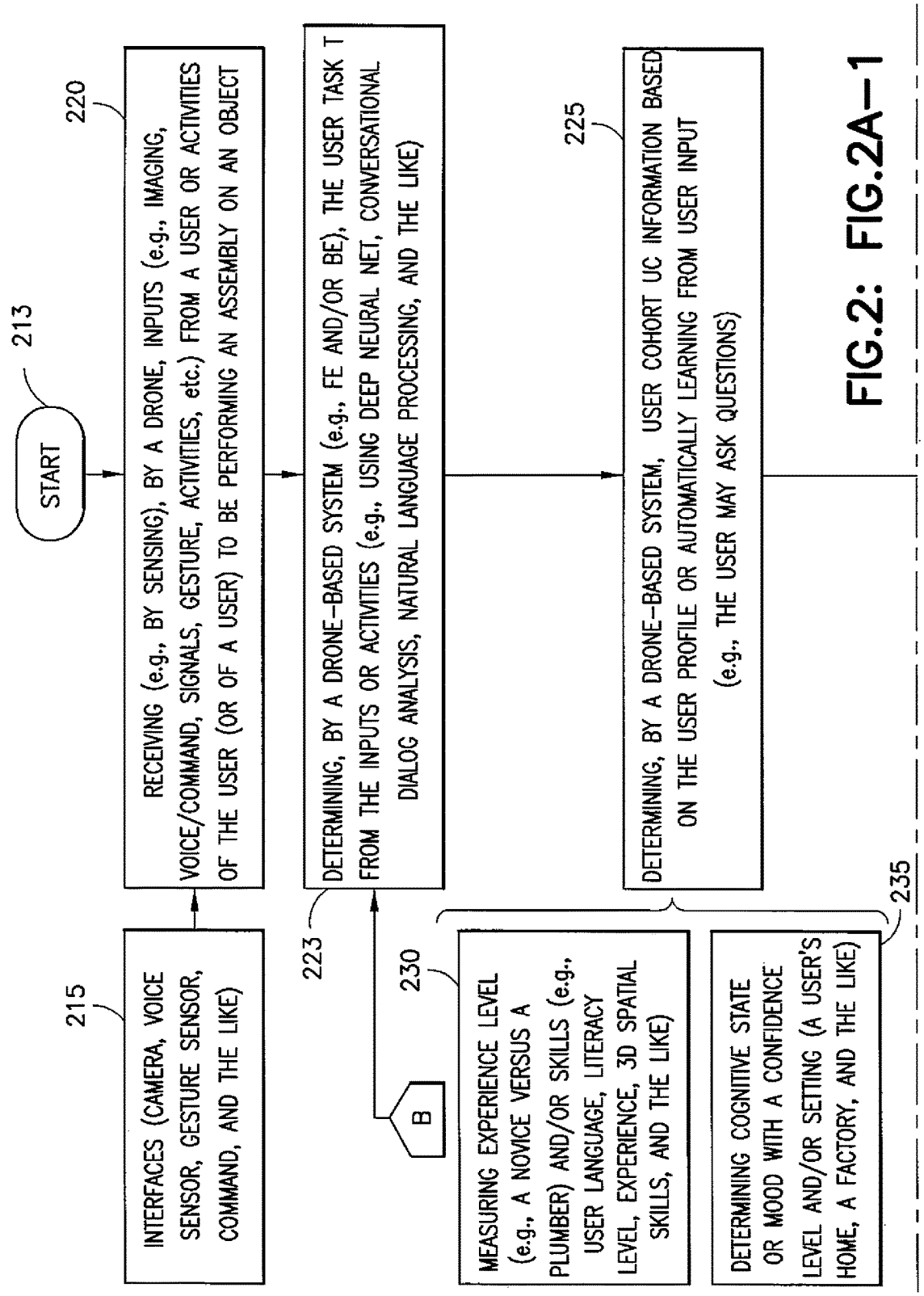

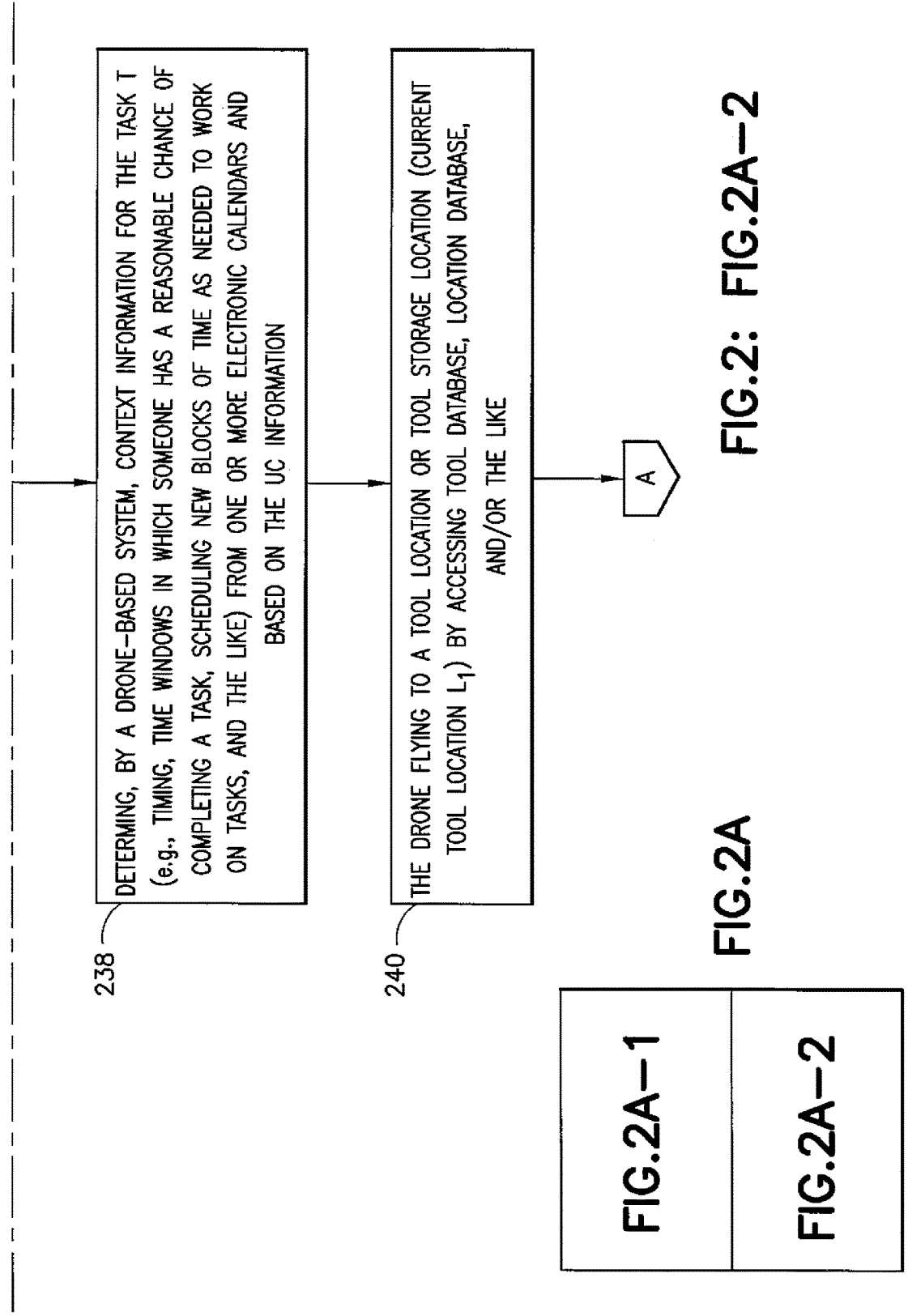

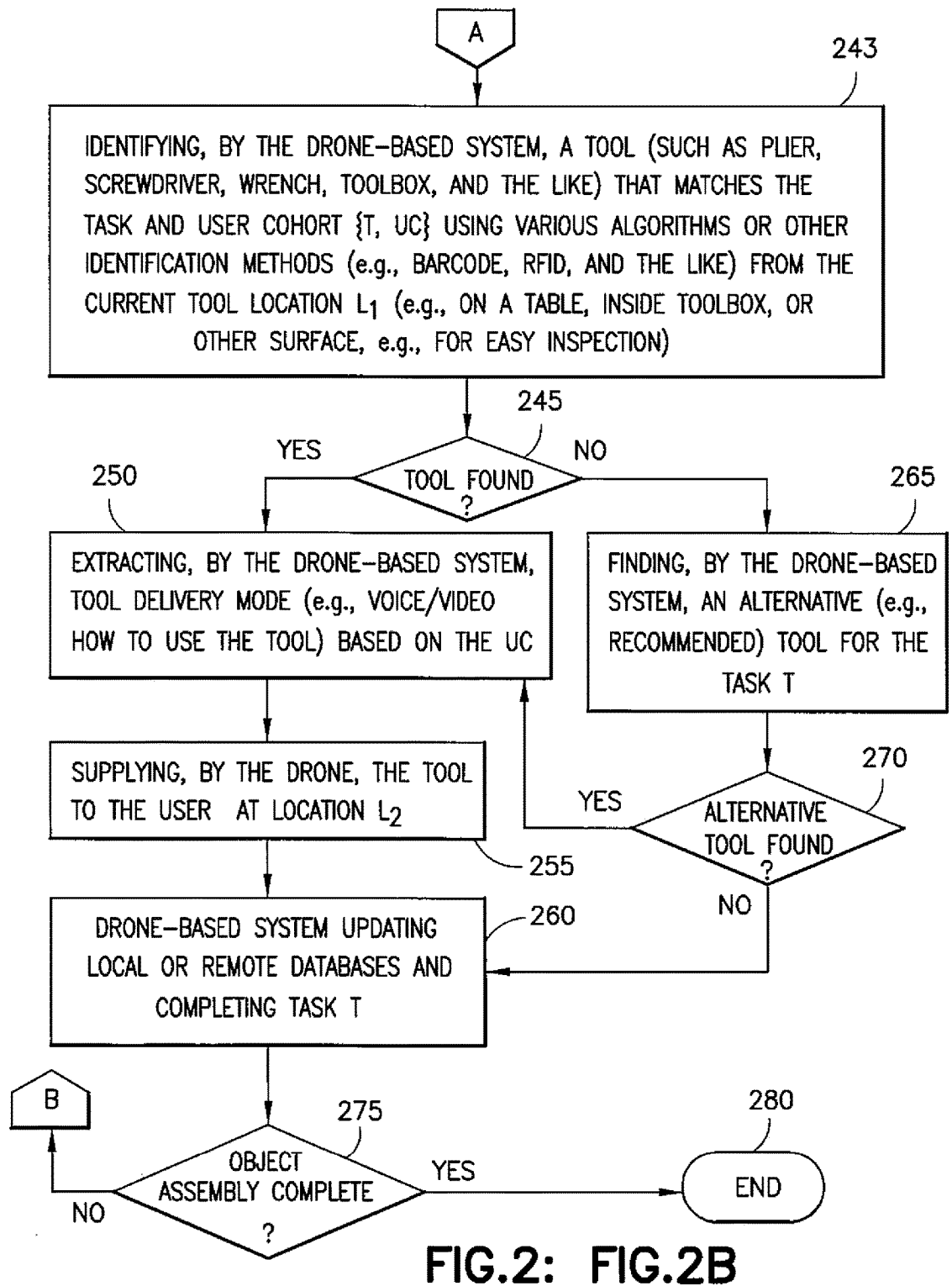
FIG.2: FIG.2B

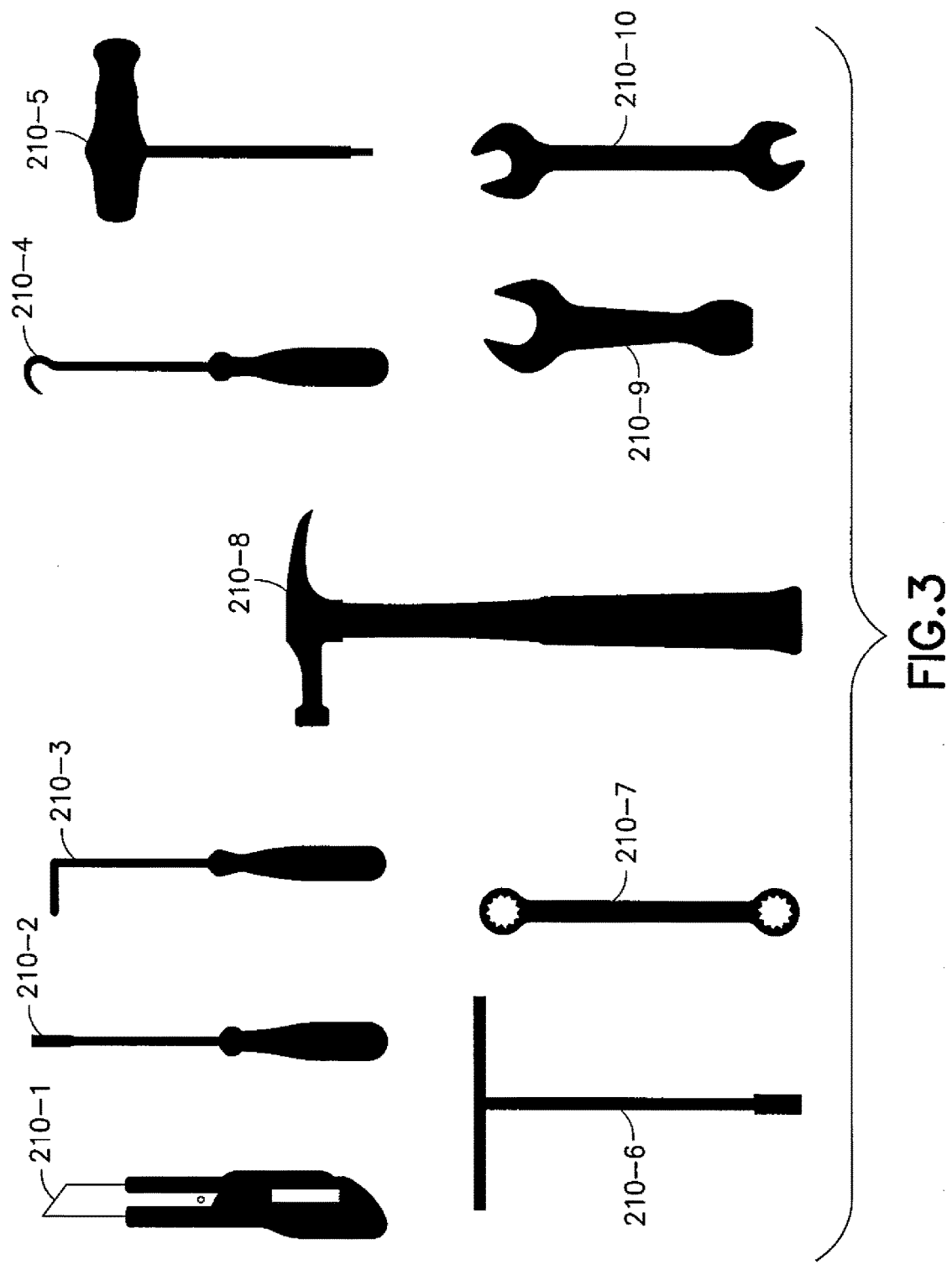

DRONE AND DRONE-BASED SYSTEM AND METHODS FOR HELPING USERS ASSEMBLE AN OBJECT

BACKGROUND

The present invention relates to drones, and more particularly to using drones for helping for users assembling objects.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

Drones (also called "unmanned aerial systems") are becoming ubiquitous. Computerized flight control systems, multi-rotor technology, and inexpensive systems have allowed drones to penetrate many markets. New drones may have fly-by-wire implementations, which means they can basically pilot themselves, especially when equipped with GPS, optical flow, and other guidance systems.

It is expected that the civilian drone industry could generate upwards of many billions over the next decade, and sales of global consumer drones have grown from nearly zero several years ago to $1.6 billion globally.

In the consumer space, many of the drones are used as toys. Drones in the commercial space are used for surveillance, aerial photography, and mapping. Other uses have been proposed, such as delivery of packages from retailers to consumers. However, drones could be of more use to people.

SUMMARY

This section is intended to include examples and is not intended to be limiting.

In an exemplary embodiment, a method comprises determining, by a drone-based system, a user cohort for one or more users to assemble an object and assessing by the drone-based system a task for the one or more users to assemble the object. The method also comprises providing, based on the determined user cohort and the assessed task, by a drone of the drone-based system help to the one or more users as the one or more users assemble the object.

In another exemplary embodiment, an apparatus comprises a drone-based system. The drone-based system comprises a drone, and one or more memories and computer readable code and one or more processors. The one or more processors, in response to execution of the computer readable code, cause the drone-based system to perform at least the following: determining a user cohort for one or more users to assemble an object; assessing a task for the one or more users to assemble the object; and providing, based on the determined user cohort and the assessed task, by the drone help to the one or more users as the one or more users assemble the object.

In a further exemplary embodiment, a computer program product is disclosed. The computer program product comprises a computer readable storage medium having program instructions embodied therewith. The program instructions are executable by a drone-based system to cause the drone-based system to perform at least the following: determining, by a drone-based system, a user cohort for one or more users to assemble an object; assessing by the drone-based system a task for the one or more users to assemble the object; and providing, based on the determined user cohort and the assessed task, by a drone of the drone-based system help to the one or more users as the one or more users assemble the object.

BRIEF DESCRIPTION OF THE SEVERAL VIEWS OF THE DRAWINGS

FIG. 1, split into FIGS. 1A and 1B, illustrates an exemplary system for, a drone and drone-based system for helping users assemble an object;

FIG. 2, which includes both FIGS. 2A and 2B, is an example of a method for helping users assemble an object using a drone and/or drone-based system, where FIG. 2A is split into FIGS. 2A-1 and 2A-2;

FIG. 3 illustrates an outline of tools, such as that which might be stored or used for deep neural net identification;

DETAILED DESCRIPTION

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The instant specification is divided into sections. The sections are not meant to be limiting, but are used for ease of reference.

Overview and Possible System

As described above, while drones are becoming ubiquitous, they have not become helpful to people. One way drones could be more helpful to people is through assembling objects. People all around the world assemble objects using tools, instruction manuals, and the like. This frequent use is one motivation for the embodiments presented herein. Such use may occur in a home, in a factory, on the field, in the army, and the like. Note also that we live in a busy world, with scheduled appointments, dates, and plans. Thus, some of the calendar interfaces discussed below have added value in this type of scheduling.

Methods and systems are disclosed that comprise a flying drone with imaging devices (such as cameras) and tool carrying devices. The drone may also include circuitry for determining a user cohort and for assessing a task. Based on these, the drone brings a tool to a user and/or offers suggestions while the user assembles an object. For example, a user may be assembling furniture, and layout all his/her available tools on a table or surface, and have an instruction manual as input to the drone system. The drone has many advantages in that it is highly mobile, can visually examine features from many angles, has video capability, and the like. The drone system may have a bidirectional interface to one or more electronic calendars, as described below, which allow, e.g., tools to be delivered promptly or in advance of a step of assembly.

Figure 1A:
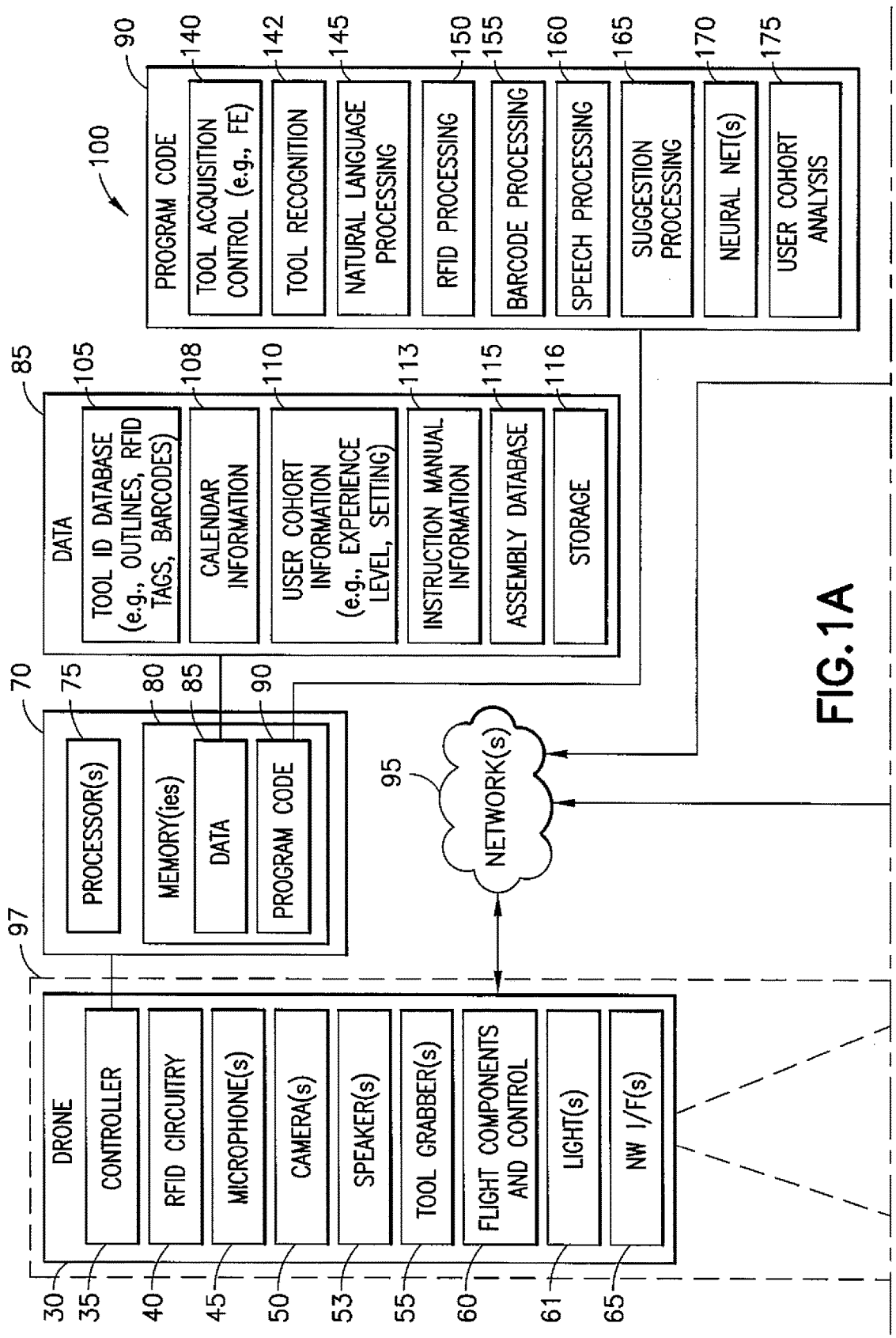

More detailed description of exemplary embodiments is presented after an exemplary system is introduced in reference to FIG. 1, which is split into FIGS. 1A and 1B. Turning to FIG. 1, this figure illustrates an exemplary system 100 that may be used for drone-based system for helping users assemble an object, such as by performing tool acquisition for assembly, e.g., using pattern recognition and cohorts. The system 100 is merely exemplary and illustrates one possible system, and others may be used. The description of FIG. 1 is primarily an introduction to the elements in the system 100, and many of the elements will be described in more detail after the description of FIG. 1.

The drone 30 in this example helps the users 10-1 and 10-2, who are using an instruction manual 15 to assemble the object 25 using the tools 20. There could be one or two or more users 10, and it is assumed below for ease of reference that there is a single user 10. It is noted that although the emphasis herein is for the tools (and other help) to be provided to the user 10, the parts 21 that make up the object 25 may also be provided to the user 10. The drone 30 comprises a controller 35, RFID (radio frequency identification) circuity 40, one or more microphones 45, one or more speakers 48, one or more cameras 50, flight components and flight control 60, one or more lights 61, and one or more network (NW) interfaces (I/F(s)) 65. The one or more network interfaces 65 allow the drone to communicate over the network(s) 95, which could include a LAN (local area network), and/or the Internet, and/or other networks such as Bluetooth (a short range wireless connectivity standard). Not shown in FIG. 1 is a wireless controller for the drone 30, as the drone 30 is considered to be autonomous, but a wireless controller could be used.

The RFID circuity 40 has circuitry to communicate with RFID tags (not shown in FIG. 1), using circuitry and techniques already known. The one or more microphones 45 are used for the drone 30 to listen to the user 10, and the one or more speakers 48 are used by the drone to communicate sound to the user 10. The tool grabber 55 (or grabbers) may be of any type of implement that can grab onto a tool 20, allow the drone 30 to carry the tool 20 to the user 10, and allow the drone to deliver the tool 20 to the user 10 (e.g., the user could grab the tool 20 from the drone 30 or the drone 30 could set the tool 20 down). There are a number of tool grabbers that can be used, such as the mantis drone claw, and the tool grabber(s) 55 can include robotic devices, too. The flight components and flight control 60 are such items as rotors and corresponding engines, control systems for flight, and the like. The one or more lights 61 may be used for many purposes, such as lighting an area of the object 25 currently being assembled, highlighting a part of the instruction manual, a tool to be used for the current task, a part to be used for the task, and the like.

It is noted that the "object 25" is being assembled, so reference to the "object 25" means the object 25 at any stage of assembly. The object 25 could be one part at the beginning of the assembly and many parts at the end of the assembly.

The controller 35 comprises circuity 70. The circuity 70 is shown as one or more processors 75 and one or more memories, and the memories comprise data 85 and program code 90. The one or more processors 75 cause the drone to perform operations as described herein, in response to loading and execution of the program code 90. This is merely one example, and the circuity 70 may be implemented (in whole or part) by other hardware such as very large scale integrated circuits, programmable logic devices, and the like. The circuity 70 may also include the processors 75 and memories 80 and also this other hardware, as an example.

The data 85 includes one or more of a tool ID (identification) database 105 (e.g., outlines of tools, RFID tags, barcodes), calendar information 108, user cohort information 110 (e.g., experience level, setting), instruction manual information 113, an assembly database 115, and storage 116. The program code 90 comprises tool acquisition control code 140 (e.g., a control program to control the drone for tool acquisition for assembly of an object and also to control the other elements in the program code 90), tool recognition code 142, natural language processing code 145, RFID processing code 145, barcode processing code 160, suggestion processing code 165, one or more neural nets 170, and user cohort analysis code 175. The elements in data 85, 90, and 116 are described in more detail below. Note that the program code 90 or any one or more of its elements may be implemented (in whole or part) as circuitry, such as in a very large scale integrated circuit or programmable logic.

The system 100 also includes a user device 120 comprising one or more processors 123 and one or more memories 125, where the one or more memories 125 contain a calendar 128 and program code (PC) 91. Note that the user device 120 would typically comprise other elements, such as user interfaces (e.g., touch screen, keyboards, mice, displays, and the like), which are not shown. The one or more processors 123, in response to loading and execution of the program code 91, cause the user device 120 to perform whatever operations are performed by the device.

The system 100 includes a computer system characterized as a server 130. The server 130 includes one or more processors 133 and one or more memories 135, which include program code (PC) 92, which includes tool acquisition control (TAC) code 141 (described below). The one or more processors 133, in response to loading and execution of the program code 92 and specifically the TAC code 141, cause the server 130 to perform whatever operations are performed by the server for the instant exemplary embodiments. It should be noted that there could be multiple servers.

FIG. 1 illustrates a possibility of a drone-based system 97, which comprises only the drone 30 in some embodiments and both the drone 30 and a server 130 in other embodiments. For instance, the drone-based system 97 may be a combination of a client system (i.e., the drone 30) and a server system (i.e., the server 130 in this example). The drone 30, e.g., under control at least in part by the TAC code 140, may in this case be considered to be a front end (FE), and the server 130, e.g., under control at least in part by the TAC code 141, may be considered to be a backend (BE). In these scenarios, the two TAC codes 140 and 141 interoperate to perform the functionality described herein. For instance, depending on the capability and computation power of the drone 30, most of the system capabilities (such as intelligences) may run on the drone 30 itself, but the client system may also off-load some of the computation to the backend (e.g., the server 130). The backend system may process, analyze, and/or store (e.g., on a database) information and return results to the client system running on the drone 30. The backend system may be hosted on cloud or non-cloud environment. Note also that the drone 30 has or may have a storage component (e.g., storage 116) that can buffer or store learning models, and contain streaming data (images, voices, interactions, and the like). The streaming data may from time-to-time be sent to backend storage (on a cloud or non-cloud dedicated backend system). The sending of data to the backend system may be based on the processing capabilities of the drone or based on the value of the data to which we may introduce software modules or may even apply conventional systems.

Furthermore, while there are many elements in the program code 90 and the data 85 that are attributed to the drone 30 in the description below, some or all of these elements (or portions of them) may be added to the server 130. For instance, for voice recognition or natural language processing, some or all of this may be performed by the server 130. Similarly, some or all of the data 85 may be stored by the server 130. This offloads some of the processing and/or data storage from the drone 30 to the server 130, and the exact amounts of what will be stored where or where the processing will take place is up to the implementation. The server 130 may also be in the cloud, or there could be multiple servers 30, e.g., each performing some function, or a combination of local servers (e.g., onsite) and remote servers (e.g., in the cloud).

The calendar 128 is the user's calendar (or multiple user's calendars if there are multiple users) may be solely on the user device 120, or on the server 130, or on both the user device 120 and the server 130.

The computer readable memories 80, 125, and 135 may be of any type suitable to the local technical environment and may be implemented using any suitable data storage technology, such as semiconductor based memory devices, flash memory, magnetic memory devices and systems, optical memory devices and systems, fixed memory and removable memory, or some combination of these. The processors 75, 123, and 133 may be of any type suitable to the local technical environment, and may include one or more of general purpose processors, special purpose processors, microprocessors, gate arrays, programmable logic devices, digital signal processors (DSPs) and processors based on a multi-core processor architecture, or combinations of these, as non-limiting examples.

The user device 120 and the server 130 maybe, e.g., personal computer systems, laptops, wireless devices such as smartphones and tablets, and "computer systems" formed in the cloud from multiple processors and memories.

Exemplary Flow

Referring to FIG. 2, this figure is an example of a method for helping users assemble an object using a drone and/or drone-based system. FIG. 2 includes both FIGS. 2A and 2B. The method in FIG. 2 starts in block 213. In block 220, the drone 30 (or drone-based system 97) receives inputs (e.g., imaging, voice/command, signals, gesture, activities, and the like) from a user or activities of the user (or of a user) to be performing an assembly on an object. Note also that the receiving can include sensing by the drone, such as using the camera(s) 50 and/or microphone(s) 45 or other equipment. The sensing may be the user activities from the camera, number of people, tools around the user, and the like. In the following, it is mainly described that the drone-based system 97 performs the operations in the blocks, but this is for ease of reference.

The drone-based system 97 performs block 223, e.g., using the information received in block 220. In block 223, the drone-based system 97 determines the user task T from the inputs or activities (e.g., using deep neural net, conversational dialog analysis, natural language processing, and the like). The drone-based system 97 may include the front end (FE) (e.g., the drone 30) and/or the back end (BE) (e.g., the server 130).

In block 225, the drone-based system 97 determines the user cohort UC (e.g., a user experience group/category such as a novice versus a plumber or prior specialization) based on the user profile or based on automatically learning from user input (e.g., the user may ask questions, the user may speech about he needs a particular tool and the drone may sense that from the conversation). As for the user asking questions, based on the questions asked by the user, the drone-based system 97 may be able to determine how skilled the user is. Blocks 230 and 235 provide additional examples of FIG. 225.

In block 230, the drone-based system 97 can measure experience level (e.g., a novice versus a plumber) and/or skills (e.g., user language, literacy level, experience, 3D spatial skills, and the like) of the user or users to be assembling the object. Another example is illustrated by block 235, where the drone-based system 97 determines the cognitive state or mood of the user, where the cognitive state or mood is determined within a confidence level, and/or determines the setting (a user's home, a factory, and the like).

The drone-based system 97 performs (in block 238) determining context information for the task T (e.g., timing, time windows in which someone has a reasonable chance of completing a task, scheduling new blocks of time as needed to work on tasks, and the like) from one or more electronic calendars and based on the UC information. The context may include delivery/order/time context, such as urgent delivery, delayed delivery, multiple orders due soon, and the like. The calendar information may be used in blocks 223, 235, 238, and 240, as possible examples. Note also that the calendar may have client information, e.g., when to deliver ordered furniture (or other objects 25). The drone system may access this information when estimating the time for a task and to prioritize distribution of the tools (e.g., among multiple tasks and multiple assembly projects). For example, the drone-based system may estimate a time at which a selected one of the multiple tasks will be performed for a current object and prioritize distribution among the tasks and assembly of multiple objects of one or more selected tools to enable providing the one or more selected tools to the one or more users assembling a current object at the estimated time.

In block 240, the drone 30 flies to a tool location or tool storage location (current tool location Li) by accessing a tool database, a location database, a calendar database, and/or the like. In block 243, the drone-based system 97 identifies a tool (such as a plier, a screwdriver, a wrench, a toolbox, and the like) that matches the task and user cohort {T, UC}. This may be performed using machine learning models (e.g., machine models built using historical tools, location data, past requests/interactions, user cohort data, etc.) and other matching or similarity based algorithms or other identification methods (e.g., barcode, RFID, and the like). The identifying is performed from the current tool location $L_1$ (e.g., on a table, inside toolbox, or other surface, e.g., for easy inspection).

In block 245, the drone-based system 97 determines if the tool has been found (such as being identified). If so (block 245=Yes), the, drone-based system 97 in block 250 extracts a tool delivery mode (e.g., voice/video how to use the tool) based on the UC along with said tool to deliver. For example, based on the tasks T information (e.g., user looking for chopping dovetails, adjusting planes or driving small finishing nails), the drone may find "7 oz or 8 oz Japanese plane hammer" from the tool database. The drone-based system determines an appropriate mode for the user (based on the UC—such as whether the user is experienced of using such a tool or similar tools in the past), and possibly a short video to show how to safely use the tool. The drone 30 in block 255 supplies the tool to the user at location $L_2$. In block 260, the drone-based system 97 performs updating local or remote databases and completing task T.

In block 245, if the tool is not found (block 245=No), the drone-based system 97 finds an alternative (e.g., recommended) tool for the task T. That is, an alternative tool can include a recommended alternative tool or a similar tool (e.g., there are multiple types of pliers, many of which are interchangeable). If an alternative tool is found (block 270=Yes), the flow proceeds to block 250. If no alternative tool is found (block 270=No), the flow proceeds to block 260.

In block 275, the drone-based system 97 determines whether the assembly of the object is complete. If so (block 275=Yes), the flow ends in block 280. If not (block 275=No), the flow proceeds to block 223, where the next user task T is determined.

Tool Identification

The drone 30 performs tool identification (e.g., in blocks 243 and 265), in order to be able to deliver tools 20 to the user 10. The tool identification may be performed, e.g., by the drone 30 under control of the tool recognition code 142 (which can be started by the tool acquisition control code 140). The tool recognition code 142 may use imaging (e.g., from the one or more cameras 50) and may use deep neural nets 170 to visually identify tools such as the following: pliers, various kinds of screwdrivers, wrenches, and the like (e.g., which may be placed on a table or other surface for easy inspection). FIG. 3 illustrates an outline of tools, such as that which might be stored or used for deep neural net identification. The outlines 210-1 through 210-10 are for many different tools.

A database (e.g., tool ID database 105) may also include records on tools, tool IDs, tool uses/purposes, possibly related tools, possibly substitutable tools, and the like. The possibly related tools and possibly substitutable tools may be used, e.g., in block 265 to find an alternative tool.

Figure 4:
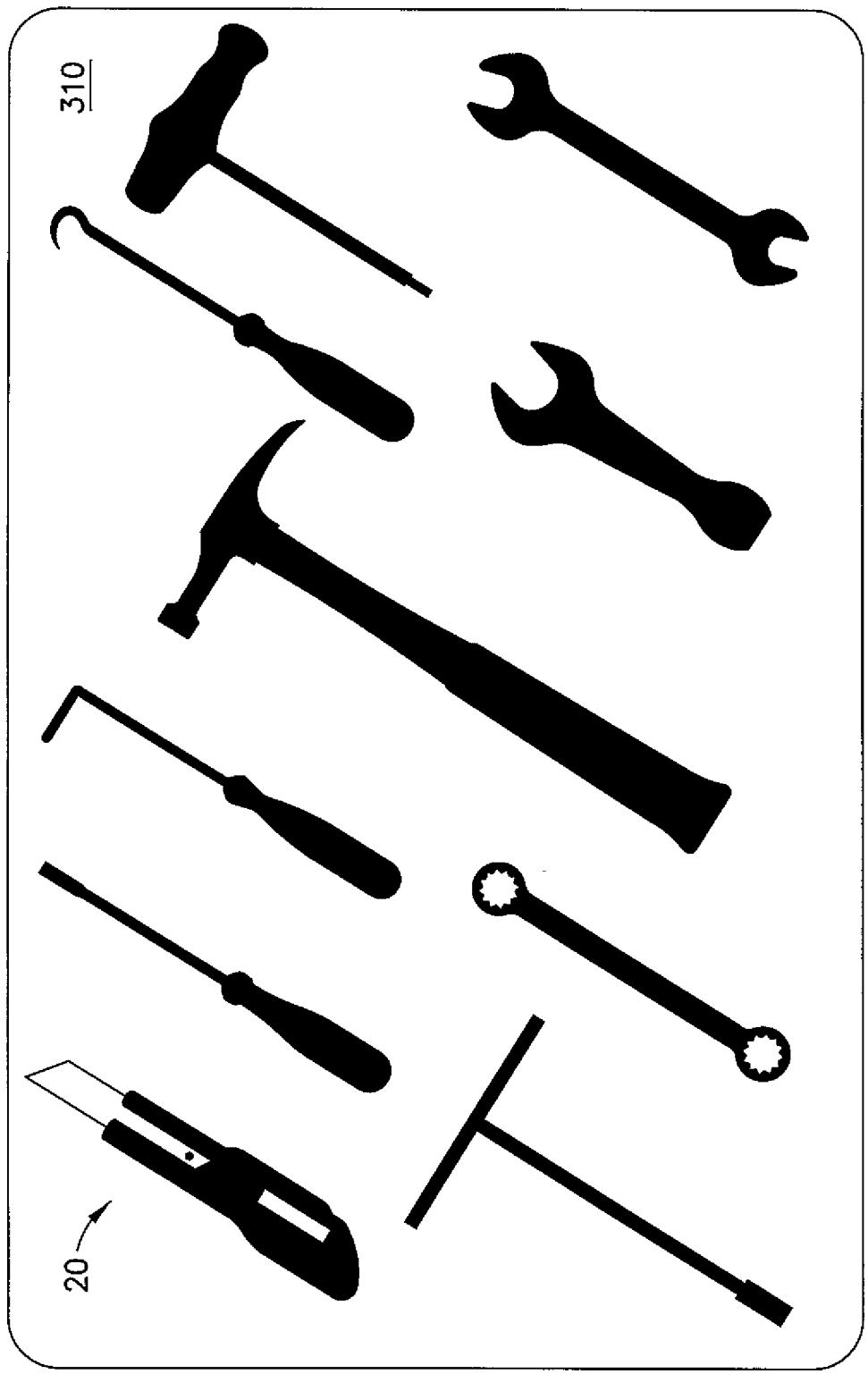
FIG. 4 illustrates tools arranged on a smart counter-top of a tool identification system.

To help the drone 30, a TIS (tool identification system) may be equipped with a smart counter-top with a scanner that may involve any of image recognition, weight estimation, and the like. FIG. 4 illustrates tools 20 arranged on a smart counter-top 310 of a tool identification system. Such a smart counter-top 310 may be used in blocks 243 and 265.

Figure 5:
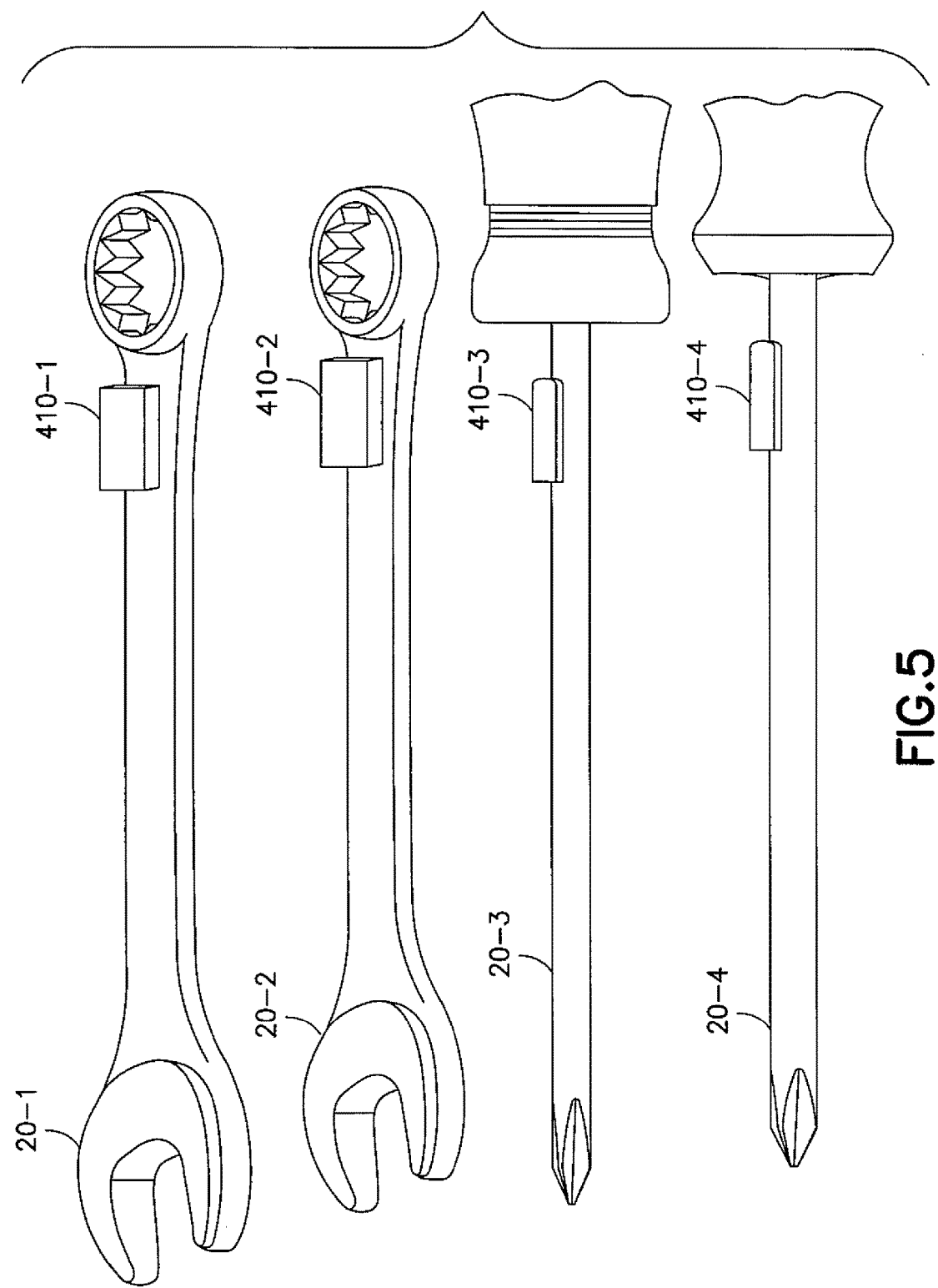
FIG. 5 illustrates the use of RFID tags on tools, to help with identification of the tools.

Also, RFID tags (or barcodes) on tools may be employed to facilitate identification. FIG. 5 illustrates the use of RFID tags 410-1, 410-2, 410-3, and 410-4 on tools 20-1, 20-2; 20-3, and 20-4, to help with identification of the tools. The tools 20-1 and 20-2 are different open end/closed end wrenches, and the tools 20-3 and 20-4 are screwdrivers. Each RFID tag 410 is unique to its corresponding tool 20. Different types of RFID tag choices include standard ultra-high-frequency (UHF) tags, with metal, non-metal, cord mount, hang tag, and the like. The drone 30, using the RFID processing code 150 as executed by the processor(s) 75, can determine the unique ID for the RFID tag 410 attached to the tool 20. That is, the RFID processing code 150 would use the information from the RFID circuitry 40 and output the unique ID from the RFID tag 410 for the tool. This could use the tool ID database 105, which could also be used by the RFID processing code 150 (or the tool acquisition control code 140) to determine the tool 20 corresponding to the unique ID.

A barcode tool tracking system may also be used. Such a barcode tool tracking system, like Tool Hawk (a barcode tracking system for tools), requires that the employee simply scan their user ID (identification) barcode and the barcodes of the tools he or she is taking to check out a tool. The drone 30, under control of the barcode processing code 155, can capture an image of a barcode using the camera(s) 50, determine the barcode, then determine the corresponding tool 20. The tool ID database 105 may include these barcodes and a mapping from barcode to tool. There would typically be a unique mapping between barcode and tool (e.g., a phillips screwdriver of having a certain size (e.g., #2) and length could have a unique barcode).

User Cohort Processing

User cohort processing is performed at least in block 225 of FIG. 2 The user cohort information 110 in the data 85 may include experience level (e.g., a novice versus a plumber) and setting (e.g., a user's home, a factory, and the like). This information may be supplied in a user profile, or automatically learned by the drone 30 system as the drone works with a user who may ask questions, be slow or fast with the tool use, and the like.

Based on user cohort analysis (e.g., user language, literacy level, experience, 3D (three-dimensional) spatial skills, and the like), the drone may translate the instruction to the preferred language of the user using NLP (natural language processing) or adjust wording to increase comprehensibility for the cohort. For example, the user may supply a profile about his or her experience or 3D spatial skills, since the user would benefit from supplying such information. In other embodiments, the system may infer at least some small amount of information regarding experience and skills by observing how much time it takes for users to perform certain activities or by emotional responses to certain activities. Using advanced content analytics (e.g., Watson content analytics, where Watson is a cognitive system enabling a new partnership between people and computers), the drone may automatically create a short demonstration video and play the video for the user. The drone may be connected to the Web/Internet and search a demonstration video (e.g., YouTube video, where YouTube is a global video-sharing website) based on the instructions on how to use the tool. Our drone can take a high-definition image of the tool and perform image search on Web, in case no instruction available for said tool. This is so important in the informal sectors (e.g., vehicle maintenance, furniture production, and the like) as many of the users may not have the skills necessary for these functions.

As more detail, it is useful to relate why the system may care about a user cohort. Consider the cohort of "experienced" (E) versus "novice" (N) users. An experienced person may actually be able to make use of substitute tools or briefer summarization of instructions than a novice user. The risk of using improper or non-optimal tools may optionally be learned through time, for a particular user and through a database containing the experiences of many people. There may be a higher risk of giving a substitute tool to the N cohort, while the E cohort may be able to use the substitute tool.

If desired, the drone may process interactive assembly instructions for a particular user or cohort (e.g., based on user experience). As input, the drone may access data from different source materials such as text-based manuals, parts catalogues, digital pictures and models, and produce electronic instructions that start with an animated, interactive, visualization of the assembly described in the text manual. A viewing mechanism (e.g., drone projecting on the wall or having a display) in conjunction with the user interface supports the user in viewing the sequence. For cohort E, perhaps brief instructions would be adequate. After all, the E cohort may have worked on a similar or identical assembly in the past. For cohort N, he or she may require the "exact and optimal" tool and need to see clear visualizations of an assembly step. Thus the drone (or drone-based system) may convey slight variants of instructions and tools, as learned to be useful for different cohorts.

It was previously mentioned that the user cohort may include experience level (e.g., a novice vs. a plumber), working in a setting (a user's home, a factory, and the like). The user cohort could also include a consideration of a user's cognitive and physical state. For example, some users with slight deficits of motion, or tremors, may be given extra guidance, time, or even variants of tools to better fit their needs.

Calendar Processing

Calendar processing is performed at least in block 238 of FIG. 2. The drone system may have a bidirectional interface (e.g., network interface(s) 65) to one or more electronic calendars 128. This access facilitates estimating timing, such as time windows in which someone has a reasonable chance of completing a task, scheduling new blocks of time as needed to work on tasks, and the like.

As described above, the drone-based system may have a bidirectional interface to one or more electronic calendars (e.g. for helping to estimate timing, time windows in which someone has a reasonable chance of completing a task, scheduling new blocks of time as needed to work on tasks, etc.). The electronic calendar 128 may detect a need for delaying an assembly as a result, for example, and may change a time on the calendar as a result. This may be useful if preparation is expected to take several hours, and a user's colleagues are happy to delay their arrival by 30 minutes.

Additionally, the drone-based system may orchestrate the usage of tools among a group of users. The drone-based system may arrange, prioritize, and deliver tools based on the tasks of individual users. The prioritization of tasks and tools usage may be based on analyzing or comprising of orders available on users' calendars.

Task Assessing, Suggestion Processing, and other Processing

A task can be assessed by the drone 30 (or the drone-based system 97) (see, e.g., block 223 of FIG. 2), and also the drone 30 may make suggestions to the user 10. For instance, natural language processing (e.g., by the natural language processing code 145) may be employed to help interpret instruction and assembly manuals (such as instruction manual 15), and/or items to be assembled may come with a second set of special "instructions" more suited to interpretation by the drone system. That is, the task assessing may be aided by a feed from an instruction manual (e.g. from a consumer store for building a set of shelves).

The suggestions (e.g., produced by the suggestion processing code 165) made by the drone 30 may include informing the user that he/she is missing a step, using the wrong tool, does not have a tool (but may use a substitute, and the like). An assembly database 115 may store a plurality of instructions/recipes and tool data corresponding to the instructions, a user's deviations from a suggested instruction (e.g., to help the user recreate the customized set of steps at a later date, if the user is doing more than one assembly of items), a history, frequency and a preference of user for different kinds of instructions, and the like. With regard to missing a step, it is noted that when assembling some complicated object, such as a complicated piece of furniture, it is fairly easy to "miss a step." Although one aspect of the exemplary embodiments herein is the drone bringing a tool to the user, since the drone has access to the (e.g., interactive) instruction manual information and tools in the vicinity of the user, the drone can also inform the user he or she has missed a step in an assembly sequence. After all, the drone has information on the instructions and can watch the user as he/she assembles an object or uses a tool. For example, imagine Step 2 of an assembly sequence may require a screw driver and a particular screw. Step 3 may require a wrench and a nut. Using various methods (including deep neural nets to recognize tools or parts of an object to be assembled), the drone may be able to determine that the wrench has been used by a user (Step 3) before the screw driver was used (Step 2).

The drone-based system may learn (e.g., if a user is fast at a task, this may imply that the drone system may be working well, but if the person is showing signs of confusion (e.g., by facial expression or voice analysis), the system may use a different set of words or explanations in any speech output, suggest the use of simpler tools, and the like).

Various approaches are possible for estimating a cognitive state or mood, with a confidence level. There are applications that can estimate a mood based on a person's face. For instance, there is an app called clmtrackr, which is an emotion analysis tool. A camera 50 can take a picture of the face of the user 10, and this can be used as guidance.

Tool Acquisition Processing

As one example, the drone system may detect or forecast a need for a tool that the user does not have and send a signal to trigger a purchase or a loan of such a tool. The actual purchase or loan may require user confirmation.

Another exemplary embodiment is tool swapping suggestions. For example, if one tool is not available, tool swapping can be suggested (as in block 265 of FIG. 1). This is useful in a group working situation, wherein User 2 needs the same tool which is currently used by User 1, and User 2 needs to wait for time to use the tool. In this case, the system may suggest the use of another tool to User 2 and perform a simple risk/cost/benefit analysis regarding a substitution. For example, in a very simple case, obviously if a small screw driver is available, but a larger one is needed, the cost is high in terms of trying to use the small version (e.g., high in terms of frustration level or time needed to perform a task). The risk of using improper or non-optimal tools may optionally be learned through time, for a particular user and through a database containing the experiences of many people.

The drone system may detect the need for a cluster (e.g., a group) of tools that may depend on one another and may suggest or bring such a cluster. Tools may depend on each other if, for instance, one tool has to be used before another tool. A closed end wrench might be used to tighten a nut before a torque wrench is used to ensure the nut is tightened to a proper torque value. As another example, the drone system may learn tool choices by observing and compiling uses by various individuals over time.

Additional Examples

The system may establish a communication with remote helpers, if determined to be needed. The remote helpers are in a location physically separate from where the user 10 is assembling the object 25.

The drone-based system 97 (such as the drone 30) may be branded and tailored for special purposes, e.g., a "Furniture Drone" for help assembling furniture. The term "branded" means, in part, is that various stores could place their brand (e.g., logo, registered trademark) on the drone. Of course, the term "branded" can go beyond this, such as having the drone be shaped in accordance with a company's trademark. Additionally, the drone may be tailored in the sense the drone may have special features that would be particularly useful for a task. As just one example, optionally, a drone for plumbing might have certain flight control, engine, and tool grasping characteristics to help the drone carry, grab, and safely control the transport of heavier tools. A furniture drone from a furniture store might only need to grab, carry, and control lighter tools, like screw drivers and related tools.

The drone may have a light, and this light may be used to illuminate a tool as means of suggesting its use, illuminate a region of an assembly (or the object 25) to help a user, illuminate a hole in an assembly to make it easier for a user to position a screw, illuminate a portion of the object or one or more parts to be used in assembling the object to highlight these regions for the assembly, and the like.

In some cases, the drone may communicate with smart toolboxes (e.g., one or more boxes that organize, carry, and protect the owner's tools), toolsets, tool belts/aprons, tool chests, bucket organizers, autocarts, workshop trollies, and the like. In these cases, the drone may be helpful to direct a user to a toolbox that is most appropriate and/or that contains the needed tools.

In yet another embodiment, the user's preparation actions are monitored, using one or more sensors. Gestures that correspond to the current preparation step are retrieved from the data store (e.g., perhaps in the assembly database 115) along with thresholds that correspond to each of the gestures. The user's actions are compared to the retrieved gestures using the retrieved thresholds. If the user's actions vary from the gestures by more than the thresholds, an alert is generated. The user is then provided with a suggested course of correction.

If desired, the drone may optionally project a display of one or more steps of an instruction manual (or speak such steps). For example, an electronic device (or drone or part of the drone-based system) may have a storage unit that stores an instruction manual data and a display control unit that reads instruction manual electronic data from the storage and the drone may interact with the electronic device (or its own storage or the part of the drone-based system) and display the instruction manual on a display device, on a wall, or the like. Further, the electronic device (or drone or part of the drone-based system) may have an editor that is capable of editing the instruction manual displayed on the display device and a control member for operating the display control unit and the editor, making it possible to edit the instruction manual electronic data according to the needs of a user, for example, in order to make the instruction manual easier to use for the current user or future users on a team, and the like.

If desired, the drone-based system may communicate with the user who wears a headset. The user may also signal the drone that he/she is ready for the next step in an assembly, or to slow down, and the like. The drone may deliver audio commands via the headset.

If desired, the drone may process interactive assembly instructions for a particular user or cohort (e.g., based on user experience). As input, the drone may access data from different source materials such as text-based manuals, parts catalogues, digital pictures and models, and produce electronic instructions that start with an animated, interactive, visualization of the assembly described in the text manual. A viewing mechanism (e.g., a drone projecting on the wall or having a display) in conjunction with the user interface supports the user in viewing the sequence.

Possible application of the system may be for tools used in gardening, event organizing (e.g., group tents setup), furnisher SMEs (Small and Medium-sized Enterprises), and the like, are also envisioned.

In another embodiment, the drone may orchestrate the usage of tools among a group of users. It may arrange, prioritize, and deliver tools based on the tasks of individual users. The prioritization of tasks and tools usage may be based on analyzing or comprising of orders available on users' calendars.

Optionally, in the context of a repair/assembly/construction shop, the drone may assist the owner by estimating the time it takes to complete a client order (e.g., a king-size bed needs to be ready in 2 days for a client X), using similar orders in the past and current context information. In a non-formal setting, often it is difficult to assess the quality of assembling /producing a furniture; the drone may have a learning component to continuously (end to end) assess the quality of a furniture based on best practices, based on learning from instructions, based on learning of past user/customer feedback on similar delivered furniture, and the like.

In another use, the drone can be used to rent tools (including time keeping, pricing for the usage, and the like) to other users when the owner is not using them. In this case, the drone may fly with the toolbox and assist the renter to do his/her job.

As another example, the drone-based system may monitor user behavior (including facial expressions, using known methods). If the user appears confused and/or is not assembling the object in an efficient (e.g., timely) manner, the drone may take steps to reduce confusion of the user or improving timeliness of the assembly by the user. For example, the drone may speak using different words, the drone may project certain additional diagrams with animations of parts, the drone may explain the use of a tool as the drone brings the tool to a user, and the like. The system may learn that if a user is overall appearing confused for a duration of time, then the system may switch into a more helpful mode useful for the cohort of confused users (e.g., beginning users), for the remainder of the assembly.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-pro grammable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A drone comprising:
   at least one user interface;
   at least one imaging device;
   one or more memories bearing computer-readable code; and
   one or more processors, wherein the one or more processors, in response to execution of the computer-readable code, are configured to cause the drone to perform at least the following:
   determine a user cohort for one or more users to assemble an object, wherein a user is a person, wherein the user cohort is based on one of a provided user profile, learning by the drone from observation, and learning from received user inputs;
   assess a task for the one or more users to assemble the object; and
   provide help, based on the determined user cohort and the assessed task, to the one or more users as the one or more users assemble the object,
   wherein the help is at least one of the following:
      one or more suggestions to the one or more users to aid the one or more users in assembling the object;
      a tool for the one or more users;
      scheduled or rescheduled time for one or more users to assemble an object based on calendar information;
      information conveyed from interactive assembly instructions to a user about how to use the tool or perform assembly using the tool;
      one or more steps to reduce the confusion of the user or to improve timeliness of the assembly by the user.

2. The drone of claim 1, wherein the one or more suggestions comprise at least one of the following:
   information that the one or more users are missing a step in assembly of the object;
   information that the one or more users are using an incorrect tool for the task;
   information that the one or more users do not have a tool to be used for the task; and
   information that the one or more users do not have a tool to be used for the task but may use a substitute tool.

3. The drone of claim 1, further comprising a tool grabber, wherein the one or more processors, in response to execution of the computer-readable code, are further configured to cause the drone to perform at least the following:
   select a tool based on the task and the user cohort; and
   provide the selected tool to the one or more users.

4. The drone of claim 3, wherein the one or more processors, in response to execution of the computer-readable code, are further configured to cause the drone to perform at least the following:
   identify, via the at least one imaging device, the selected tool prior to providing the tool; and
   retrieve the tool prior to providing the tool.

5. The drone of claim 3, wherein the one or more processors, in response to execution of the computer-readable code, are further configured to cause the drone to perform at least the following:
   identify the selected tool, prior to providing the tool, by one or both of the following:
      a barcode on one or more tools via the at least one imaging device; and
      information on a radio frequency identification tag attached to one or more tools; and
   retrieve the selected tool using the drone prior to providing the selected tool.

6. The drone of claim 3, wherein, when the selected tool is not available, the one or more processors, in response to execution of the computer-readable code, are further configured to cause the drone to perform at least the following:
   find an alternate tool that is suitable for use as the selected tool;
   choose the alternate tool as the selected tool; and
   provide the alternate tool to the one or more users.

7. The drone of claim 3, wherein the one or more processors, in response to execution of the computer-readable code, are further configured to cause the drone to perform at least the following:
   detect a need for a cluster of tools and designate the selected tool be the cluster of tools; and
   provide the cluster of tools to the one or more users.

8. The drone of claim 3, wherein the one or more processors, in response to execution of the computer-readable code, are further configured to cause the drone to perform at least the following:
   learn tool choices by observing and compiling uses by various individuals over time.

9. The drone of claim 3, wherein the one or more processors, in response to execution of the computer-readable code, are further configured to cause the drone to perform at least the following:
   communicate with one or more smart toolboxes in order to locate the selected tool.

10. The drone of claim 3, wherein the one or more processors, in response to execution of the computer-readable code, are further configured to cause the drone to perform at least the following:
   orchestrate usage of tools among a group of users by arranging, prioritizing, and delivering tools based on tasks to assemble the object and based on context of the task.

11. The drone of claim 1, wherein the one or more processors, in response to execution of the computer-readable code, are further configured to cause the drone to perform at least the following:
   access one or more electronic calendars for at least the one or more users;
   obtain calendar information from the one or more electronic calendars; and
   schedule or reschedule time for one or more users to assemble an object based on the obtained calendar information.

12. The drone of claim 11, wherein the task comprises multiple tasks and/or the object comprises multiple objects, each object with at least one task such that there are multiple tasks in total, and the one or more processors, in response to execution of the computer-readable code, are further configured to cause the drone to perform at least the following:
   estimate a time at which a selected one of the multiple tasks will be performed;
   prioritize distribution among the tasks and assembly of the multiple objects of at least one selected tool; and
   provide the at least one selected tool to the one or more users assembling the current object at the estimated time.

13. The drone of claim 1, wherein the user cohort comprises one or both of experience level of the one or more users and setting in which assembly of the object is being performed.

14. The drone of claim 1, wherein the assessing of the task is aided by information from an instruction manual comprising assembly instructions for the object.

15. The drone of claim 1, wherein the one or more processors, in response to execution of the computer-readable code, are further configured to cause the drone to perform at least the following:
   communicate with one or more remote helpers, in response to a determination the one or more remote helpers are needed.

16. The drone of claim 1, wherein the one or more processors, in response to execution of the computer-readable code, are further configured to cause the drone to perform at least the following:
   detect a need for a tool that the user does not have; and
   send a signal to trigger a purchase or a loan of such a tool.

17. The drone of claim 1, wherein the drone further comprises one or more lights, and wherein the help comprises using the light to perform one or more of the following:
   illuminate a tool as means of suggesting its use;
   illuminate a region of the object to help the one or more users during the assembly; and
   illuminate a portion of the object or one or more parts to be used in assembling the object.

18. The drone of claim 1, wherein the help comprises projecting a display of one or more steps of an instruction manual or speaking such one or more steps.

19. The drone of claim 1, wherein the one or more processors, in response to execution of the computer-readable code, are further configured to cause the drone to perform at least the following:
   communication between the drone and a user.

20. The drone of claim 1, wherein the one or more processors, in response to execution of the computer-readable code, are further configured to cause the drone to perform at least the following:
   process interactive assembly instructions for a particular user or cohort or both; and
   convey information from the interactive assembly instructions to the particular user about how to use the tool or perform assembly using the tool.

21. The drone of claim 1, wherein the one or more processors, in response to execution of the computer-readable code, are further configured to cause the drone to perform at least the following:
   monitor by the drone user behavior to determine whether a user appears confused or is not performing assembly in a timely manner, and
   when the user appears confused or is not performing assembly in a timely manner, take one or more steps to reduce the confusion of the user or improve timeliness of the assembly by the user.

22. The drone of claim 1 comprised within a drone system.

23. The drone system of claim 22, comprising a network in communication with the drone and at least one other drone.

* * * * *